US006990550B2

(12) United States Patent
Hesse et al.

(10) Patent No.: US 6,990,550 B2
(45) Date of Patent: Jan. 24, 2006

(54) TRANSACTION DURATION MANAGEMENT IN A USB HOST CONTROLLER

(75) Inventors: Siegfried Kay Hesse, Dresden (DE); Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 410 days.

(21) Appl. No.: 10/283,555

(22) Filed: Oct. 30, 2002

(65) Prior Publication Data

US 2003/0225957 A1 Dec. 4, 2003

(30) Foreign Application Priority Data

May 31, 2002 (DE) ............................... 102 24 163

(51) Int. Cl.
*G06F 13/20* (2006.01)
*H04J 3/16* (2006.01)

(52) U.S. Cl. ..................... 710/313; 710/311; 370/465
(58) Field of Classification Search ................ 710/313, 710/305, 260, 100, 22, 54, 52, 6; 709/102
See application file for complete search history.

(56) References Cited

U.S. PATENT DOCUMENTS

| | | | |
|---|---|---|---|
| 5,933,611 A | 8/1999 | Shakkarwar | |
| 6,324,597 B2 * | 11/2001 | Collier | ......................... 710/22 |
| 6,349,354 B1 * | 2/2002 | Garney | ........................ 710/313 |
| 6,430,634 B1 * | 8/2002 | Mito | ........................... 710/100 |
| 6,505,267 B2 | 1/2003 | Luke et al. | |
| 6,658,515 B1 * | 12/2003 | Larson et al. | ................ 710/260 |
| 6,721,815 B1 * | 4/2004 | Leete | ............................. 710/6 |
| 6,728,801 B2 * | 4/2004 | Leete et al. | .................... 710/54 |
| 6,748,466 B2 * | 6/2004 | Leete | ........................... 710/52 |
| 6,775,733 B2 * | 8/2004 | Chang et al. | ................ 710/313 |
| 6,792,495 B1 * | 9/2004 | Garney et al. | .............. 710/305 |
| 2002/0194247 A1 * | 12/2002 | Caggese et al. | ............. 709/102 |
| 2003/0065839 A1 * | 4/2003 | Howard et al. | ............. 710/100 |

OTHER PUBLICATIONS

Enhanced Host Controller Interface Specification for Universal Serial Bus, Jun. 20, 2001, Intel Corp. Rev. 0.96, pp. 53-119.*

* cited by examiner

*Primary Examiner*—Tim Vo
*Assistant Examiner*—Christopher E. Lee
(74) *Attorney, Agent, or Firm*—Meyertons Hood Kivlin Kowert & Goetzel, P.C.; B. Noël Kivlin

(57) ABSTRACT

A USB (Universal Serial Bus) host controller, a corresponding integrated circuit chip, a computer system and an operation method are provided for handling the data traffic between at least one USB device and the computer system having system memory. A transaction processing unit processes transactions to or from the at least one USB device. Further, a transaction duration management unit is provided for determining estimated duration values of the transactions. The transaction processing unit is adapted to process the transactions dependent on the estimated duration values. A descriptor-to-transaction converter may be provided, and the prefetched mechanism may be made dependent on a threshold value relating to the estimated duration values.

61 Claims, 8 Drawing Sheets

TRANSACTION DURATION MANAGEMENT IN A USB HOST CONTROLLER

BACKGROUND OF THE INVENTION

1. Field of the Invention

The invention generally relates to host controllers for handling the data traffic over a serial bus connecting peripheral devices and a system memory of a computer system, and in particular to USB (Universal Serial Bus) host controllers and operation methods.

2. Description of the Related Art

The Universal Serial Bus was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB 2.0 systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierachially by defining several layers as shown in the figure.

In the upper most layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system.

The host controller drivers 210, 220 provide a software layer between a specific hardware 215, 225, 230 and the USB driver 205 for providing a driver-hardware interface.

While the layers discussed so far are software implemented, the upper most hardware component layer includes the host controllers 215, 225. These controllers are connected to the USB device 230 that performs the end user function. Of course, for one given USB device, the device is connected to either one of the host controllers 215, 225 only.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 usually is a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-and-play support, controls a PCI-ISA (Industry Standard Architecture) bridge, manages the keyboard/mouse controller, provides power management features, and controls other peripherals.

SUMMARY OF THE INVENTION

An improved host controller technique is provided that may be incorporated into a chipset and that may increase the system performance by improving the data handling and increasing the reliability of the overall system.

In one embodiment, a USB host controller for handling the data traffic between at least one USB device and a system memory of a computer system is provided. The USB host controller comprises a transaction processing unit that is adapted to process transactions to or from the at least one USB device. The USB host controller further comprises a transaction duration management unit that is arranged for determining estimated duration values for the transactions. The transaction processing unit is adapted to process the transactions dependent on the estimated duration values.

In another embodiment, an integrated circuit chip may be provided that has circuitry for handling the data traffic between at least one USB device and a system memory of a computer system. The integrated circuit chip comprises a transaction processing circuit that is adapted to process transactions to or from the at least one USB device, and a transaction duration management circuit that is arranged for determining estimated duration values for the transactions. The transaction processing circuit is adapted to process the transactions dependent on the estimated duration values.

In a further embodiment, a method of operating a USB host controller to handle the data traffic between at least one USB device and a system memory of a computer system is provided. The method comprises determining estimated duration values for transactions to or from the at least one USB device, and processing the transactions dependent on the estimated duration values.

In yet another embodiment, a host controller is provided for handling the data traffic over a serial bus connecting at least one peripheral device and a computer system having a system memory. The host controller comprises a transaction processing unit that is adapted to process transactions to or from the at least one peripheral device. Further, the host controller comprises a transaction duration management unit that is arranged for determining estimated duration values for the transactions. The transaction processing unit is adapted to process the transactions dependent on the estimated duration values.

In still a further embodiment, there may be provided a method of operating a host controller to handle the data traffic over a serial bus connecting at least one peripheral device and a computer system having a system memory. The method comprises determining estimated duration values for transactions to or from the at least one peripheral device, and processing the transactions dependent on the estimated duration values.

Further, a computer system is provided that comprises a system memory and a host controller for handling the data traffic over a serial bus connecting at least one peripheral device of the computer system. The host controller comprises a transaction processing unit adapted to process transactions to or from said at least one peripheral device, and a transaction duration management unit arranged for determining estimated duration values for the transactions. The transaction processing unit is adapted to process the transactions dependent on the estimated duration values.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
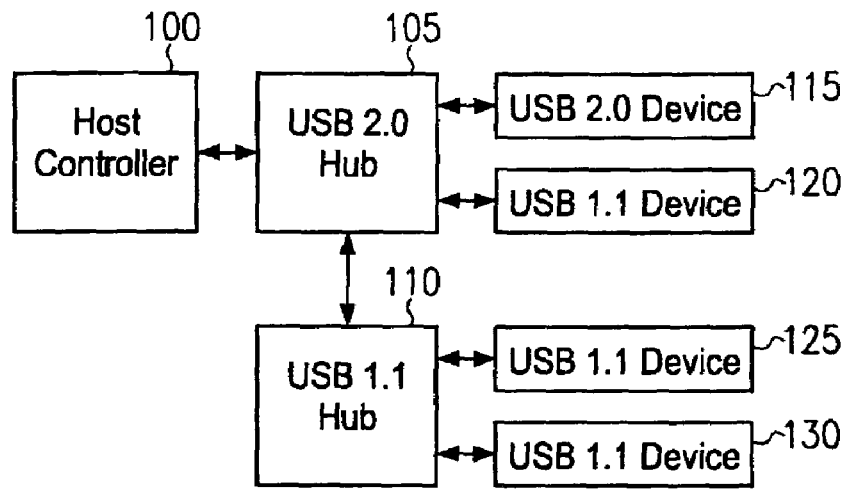
FIG. 1 illustrates an example USB 2.0 compliant system.
Figure 2:
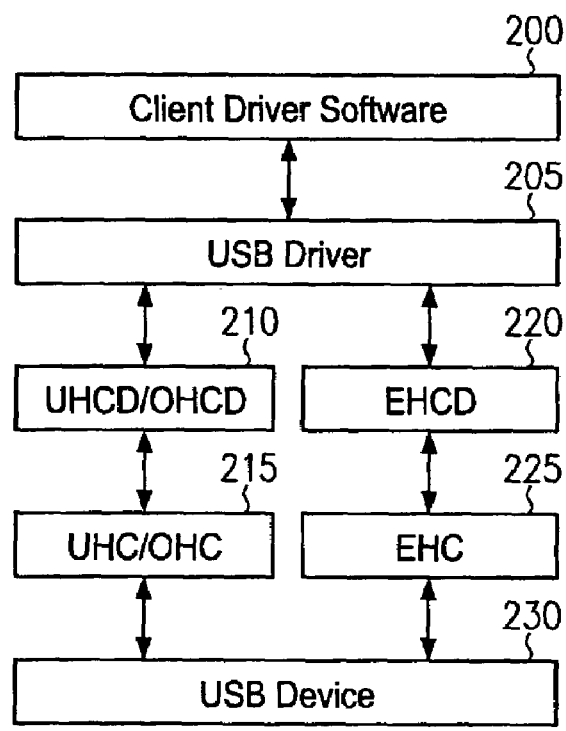
FIG. 2 illustrates the hardware and software component layers in the system of FIG. 1.
Figure 3:
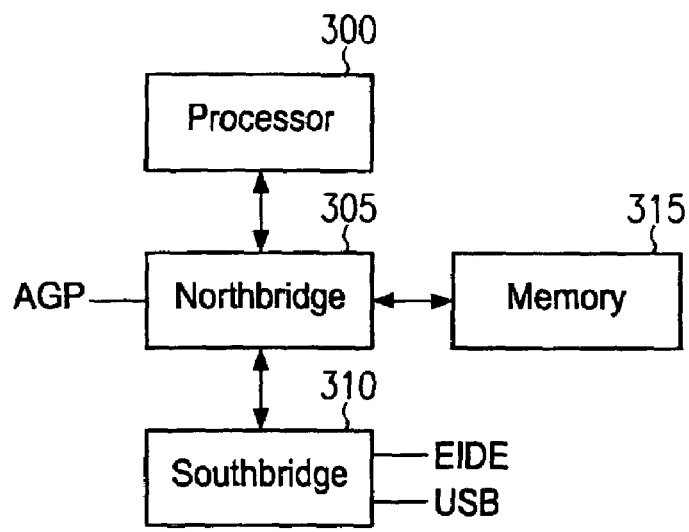
FIG. 3 illustrates a common motherboard layout.
Figure 4:
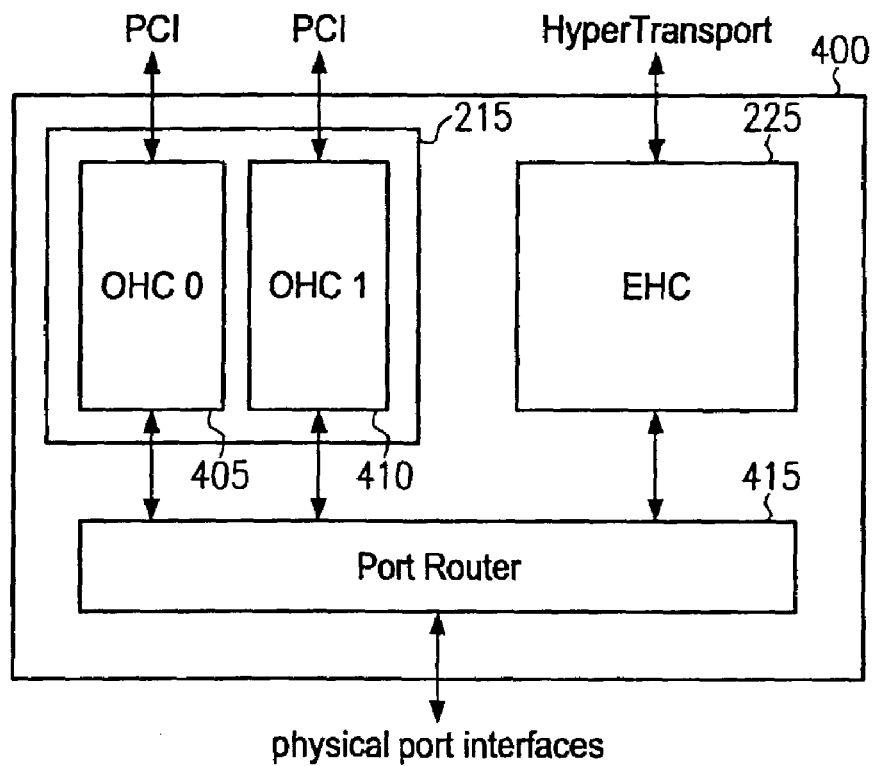
FIG. 4 illustrates the main components of the USB 2.0 compliant host controller according to an embodiment.

Referring now to the drawings and particularly to FIG. 4, the main components of a USB 2.0 compliant host controller 400 according to an embodiment are shown. In general, the host controller consists of three main components: the enhanced host controller (EHC) 225, one or more companion host controllers 215, and the port router 415.

The enhanced host controller 225 handles the USB 2.0 high speed traffic. Additionally, it controls the port router 415.

In the companion host controller unit 215 of the present embodiment, there are two OHCI compliant host controllers, OHC0 405 and OHC1 410. These controllers handle all USB 1.1 compliant traffic and may contain the legacy keyboard emulation for non-USB aware environments.

The port router 415 assigns the physical port interfaces their respective owners. This ownership is controlled by EHC registers, and per default all ports are routed to the companion host controllers in order to allow for a system with only USB 1.1 aware drivers to function. If a USB 2.0 aware driver is present in the system it will assign the ports to either a companion host controller 405, 410 for low and full speed devices and hubs (USB 1.1 traffic) or to the EHC 225 for high speed devices and hubs.

That is, the USB 2.0 host controller shown in FIG. 4 complies with the EHCI specification and allows for using existing OHCI USB 1.1 host controllers with the minimum alteration necessary to interface to the port router block 415, instead of USB 1.1 physical devices.

Plug-and-play configuration may be handled separately by each host controller 405, 410, 225. There may be an EHCI-imposed restriction that the OHCI controllers 215 must have lower function numbers than the EHCI controller 225.

The USB 2.0 compliant host controller of FIG. 4 may be defined as hardware architecture to implement an EHCI-compliant host controller for integration into a southbridge 310. The host controller then resides between the USB-2 analog input/output pins and a link interface module for interfacing upstream towards system memory, e.g. interfacing to a northbridge if there is one present in the system. This interface may be an internal HyperTransport™ interface.

The HyperTransport technology is a high speed, high performance point-to-point link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy PC buses, to be extensible to new system network architecture buses, to be transparent to operating systems, and to offer little impact on peripheral drivers.

Thus, in the embodiment of FIG. 4 a HyperTransport-based USB host controller is provided where an enhanced host controller 225 is responsible for handling all high speed USB traffic as well as controlling port ownership for itself and the companion controllers 215 via the port router 415. After power-on reset or software-controlled reset of the EHC 225, it may default to a state where all ports are owned and controlled by the companion host controllers 215, all operational registers are at their respective default values, and the EHC 225 is halted, i.e. it neither fetches descriptors from system memory 315 nor issues any USB activity. In normal operation, the EHC 225 may process asynchronous and interrupt transfers from a periodic list, bulk and control from an asynchronous list. Either list can be empty or its processing disabled by software.

Figure 5:
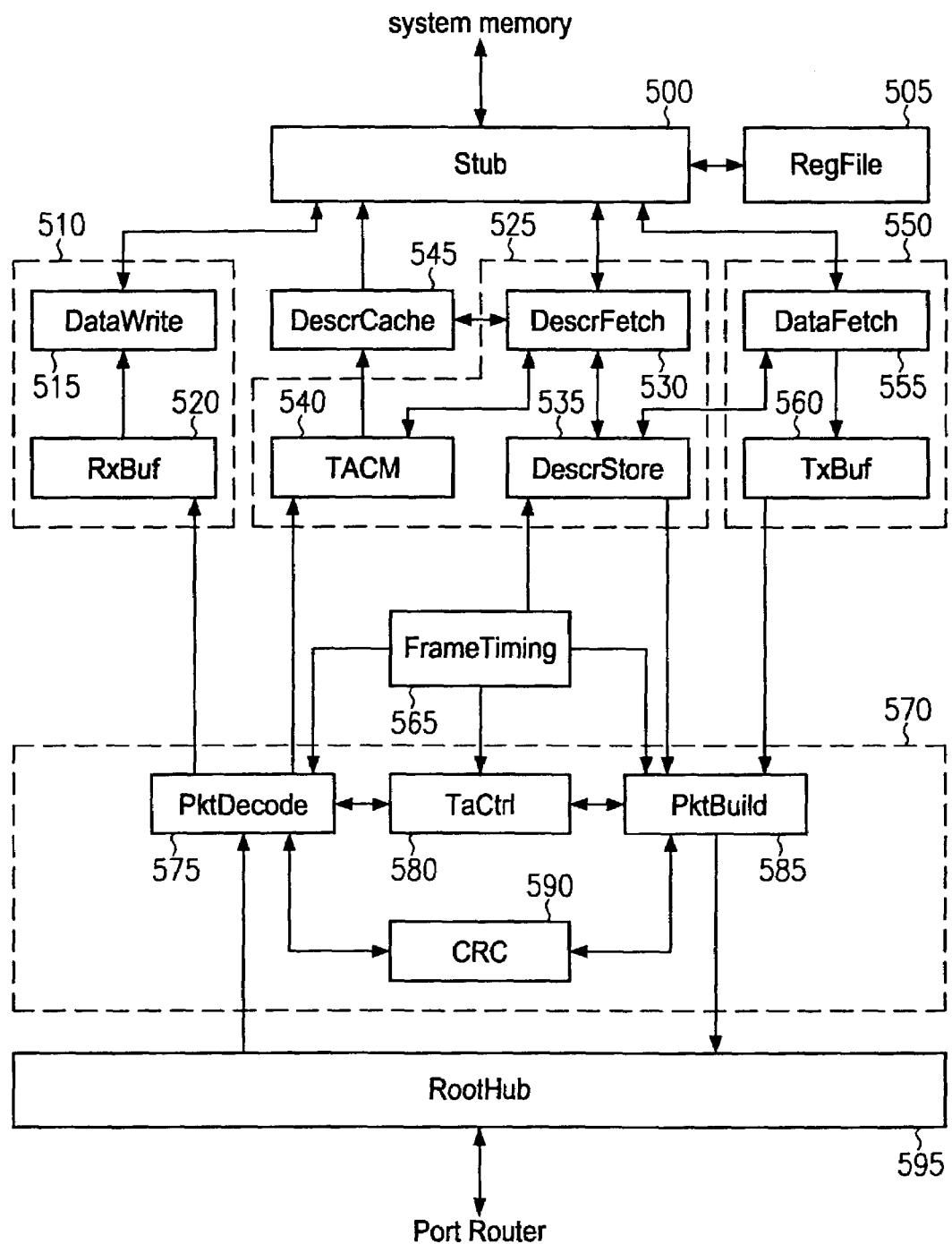
FIG. 5 is a block diagram illustrating the components of the enhanced host controller that is a component of the arrangement of FIG. 4.

Turning now to FIG. 5, the components of the enhanced host controller EHC 225 are depicted in more detail. The handling of the data traffic to and from the system memory is done by the stub 500. The stub 500 assigns the internal sources and sinks to respective HyperTransport streams, i.e. posted requests, non-posted requests, responses. The stub 500 arbitrates the internal HyperTransport interface between all internal bus masters, i.e. the receive DMA (Direct Memory Access) engine 510, the descriptor cache 545, the descriptor processing unit 525 and the transmit DMA engine 550. Thus, the stub 500 arbitrates between descriptor fetching, writing descriptors back, receiving and transmitting data.

The stub 500 is connected to a register file 505 that contains the EHCI registers. In the present embodiment, the EHCI registers store data with respect to the PCI configuration, the host controller capabilities and the host controller operational modes.

The descriptor processing unit 525 is connected to stub 500 and consists of three subunits: the descriptor fetching unit (DescrFetch) 530, the descriptor storage unit (DescrStore) 535 and the transaction completion machine (TACM) 540. The descriptor fetching unit 530 determines, based on timing information and register settings, which descriptor is to be fetched or prefetched next and sends the request to the stub 500 and/or to the descriptor cache 545. When it receives the descriptor it sends it to the descriptor storage unit 535.

The descriptor storage unit 535 holds the prefetched descriptors. By performing storage management, its main function is to provide a storage capacity to average memory access legacies for descriptor fetches.

The transaction completion machine 540 is connected to the descriptor fetching unit 530 for managing the status write-back to descriptors. For this purpose, the transaction completion machine 540 is connected to the descriptor cache 545.

This cache contains descriptors which have been prefetched by the descriptor fetching unit 530 for fast re-access. The descriptors held in the descriptor cache 545 are updated by the transaction completion machine 540 and eventually written back to system memory, via stub 500. The descriptor cache 545 may be fully associative with write-through characteristics. It may further control the replacement of the contents dependent on the age of the stored descriptors.

As apparent from FIG. 5, there are further provided the transmit DMA engine 550 and the receive DMA engine 510. The transmit DMA engine 550 consists of a data fetching unit (DataFetch) 555 and a data transmit buffer (TxBuf) 560. The data fetching unit 555 is the DMA read bus master and inspects the entries in the descriptor storage unit 535 of the descriptor processing unit 525. The data fetching unit 555 prefetches the corresponding data and forwards it to the data transmit buffer 560.

The data transmit buffer 560 may be a FIFO (first in first out) buffer, and its function corresponds to that of the descriptor storage unit 535 in that it allows to prefetch enough data for outgoing transactions to cover the memory system latency.

The receive DMA engine 510 consists of the data writing unit (DataWrite) 515 which serves as DMA write bus master unit for moving the received data that are stored in the data receive buffer (RxBuf) 520, to its respective place in system memory. The data receive buffer 520 may be a simple FIFO buffer.

There is further provided a frame timing unit (FrameTiming) 565 that is the master USB time reference. One clock tick of the frame timing unit corresponds to an integer (e.g. 8 or 16) multiple of USB high speed bit times. The frame timing unit 565 is connected to the descriptor storage unit 535 and to the packet handler block 570.

The packet handler block 570 consists of a packet building unit (PktBuild) 585 that constructs the necessary USB bus operations to transmit data and handshakes, and a packet decoder (PktDecode) 575 that disassembles received USB packets. Further, a transaction controller (TaCtrl) 580 is provided that supervises the packet building unit 585 and the packet decoder 575. Further, the packet handler 570 comprises a CRC (cyclic redundancy check) unit 590 for generating and checking CRC data for transmitted and received data.

The packet building unit 585 and the packet decoder 575 of the packet handler 570 are connected to the root hub 595 that contains port specific control registers, connect detection logic and scatter/gather functionality for packets between the packet handler 570 and the port router.

As mentioned above, the stub 500 is the responsible unit for attachment of the USB controller to the internal HyperTransport interface. Since there are several requesters 510, 545, 525, 550 using the HyperTransport interface, the stub 500 will include arbitration logic to fairly and efficiently grant the different units access to the interface. While there are four bus masters that may issue HyperTransport source requests, there is only one bus slave that will be the addressee of the HyperTransport target request: the register file unit 505.

Figure 6:
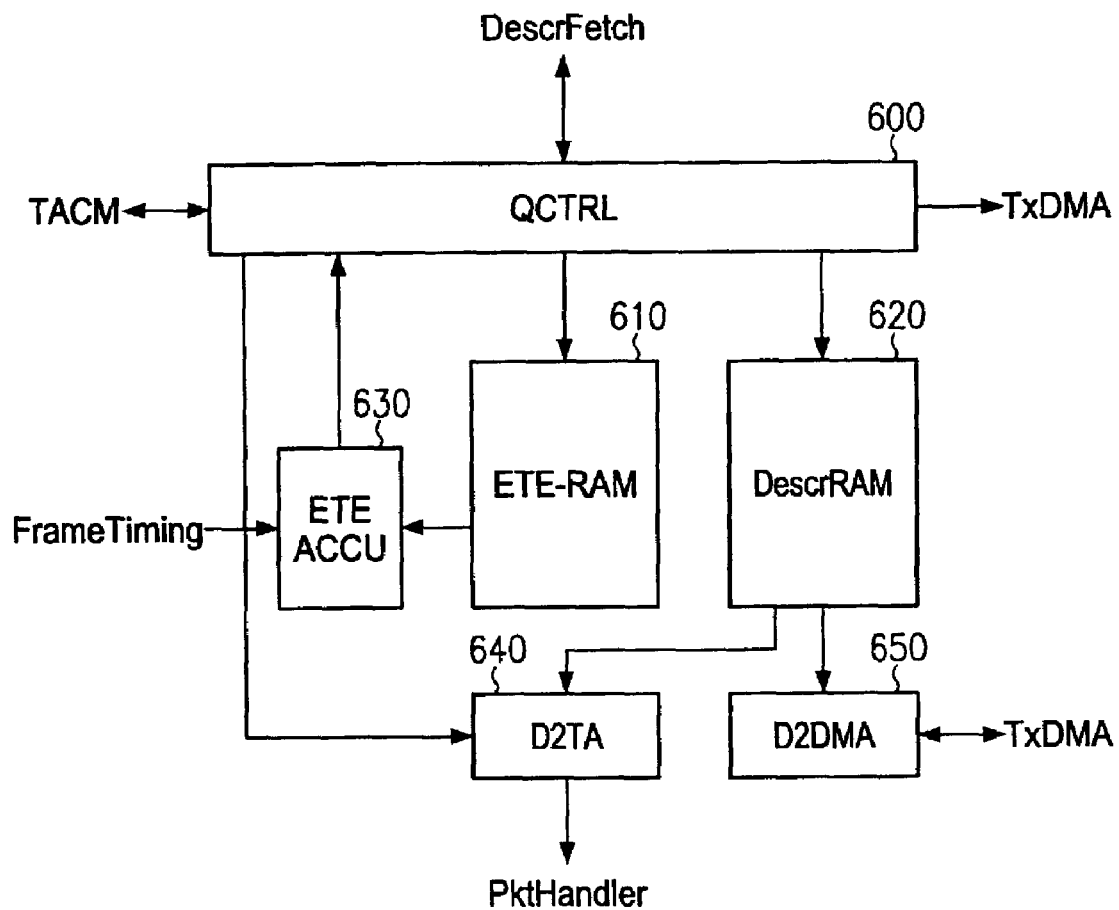
FIG. 6 is a block diagram illustrating the components the descriptor storage unit shown in FIG. 5.

Turning now to FIG. 6, the descriptor storage unit 535 shown in FIG. 5 is depicted in more detail. Operation of this unit is controlled by the controller (QCTRL) 600 that interacts with the descriptor fetching unit 530, the transaction completion machine 540 and the transmit DMA unit 550. The descriptors are stored in the descriptor RAM (DescrRAM) 620.

The descriptor storage unit 535 of FIG. 6 keeps track of the estimated time enroute (ETE) for the stored descriptors. The ETE values are calculated by the descriptor fetching unit 530 and stored in the ETE-RAM 610 parallel to their counterparts in the descriptor RAM 620.

In an embodiment, the ETE values may be calculated by applying an EHCI compliant best-fit approximation algorithm such as that of section 4.4.1.1 of the EHCI specification. Further, a parameter of the algorithm may be adapted to observed time values relating to the data traffic. For instance, the worst-case end-to-end delay in the EHCI compliant function may be replaced by an approximate value that is obtained online (e.g. by a floating mean of observed delays) to allow more asynchronous transactions to be sent out. Moreover, the algorithm may be applied to any partial data transfer of a high-bandwidth transfer where for any partial data transfer, the actual transfer length is used.

Further, an ETE accumulator 630 is provided storing an accumulator value that represents the estimated time to complete for all currently enqueued descriptors. The ETE accumulator is incremented with the ETE of each newly stored descriptor and is decremented by the ETE value of the descriptor that was most recently removed. This will be described in more detail below.

As shown in FIG. 6, the descriptor storage unit 535 further comprises a descriptor-to-transaction converter (D2TA) 640 that converts descriptors to transaction items for the packet handler. A similar operation is carried out for the transmit DMA unit 550 by the D2DMA unit 650.

As apparent from the above discussion, the host controller performs transaction duration management. The ETE accumulator 630 of the present embodiment is responsible for keeping track of the relation-between remaining time within the microframe and the estimated durations of all transfers represented by the stored entries, i.e. the ETE values. The main component is the actual ETE accumulator that contains the sum of ETE values of all transfers currently listed in the queue 620. Periodic transfers may be distinguished from asynchronous transfers. The accumulator needs to be updated, and in the present embodiment, a new descriptor is stored concurrently with processing the most recent transaction.

The ETE accumulator 630 of the present embodiment is supplied with a number of parameters for enabling the accumulator update. First of all, the accumulator unit 630 receives the sum of ETE values for a descriptor to be loaded, together with the single ETE values for maximal three transactions of that descriptor that are stored in the ETE-RAM 610. Further, the accumulator 630 receives the ETE value for the current transaction, i.e. the transaction that is just carried out by the packet handler 570, and the sum of ETE values for the whole current descriptor, i.e. the descriptor that is read out of ETE-RAM 610 by the descriptor-to-transaction unit 640. Moreover, the ETE accumulator 630 receives status information of the current transaction, e.g. an end-of-transaction flag or completion code, delivered by the packet handler. Furthermore, the ETE accumulator 630 is provided with the remaining time for the current microframe.

Additionally, the accumulator 630 is supplied with an ETE threshold value from a control/diagnostic register of the USB host controller. The ETE threshold value may be used to control the number of asynchronous descriptors that are prefetched based on their estimated time to complete. In an embodiment, the register field storing the threshold value can only be written to when the host controller is stopped, otherwise writes are ignored.

The transaction duration management follows certain rules to update the accumulator. For instance, when a new descriptor is loaded into the queue 620, the accumulator value is increased by the ETE value of the new descriptor, i.e. by the sum of the ETE values of all parts of a high-bandwidth transaction relating to that descriptor (noting that a certain descriptor may describe many such high-bandwidth transactions).

Figure 7:
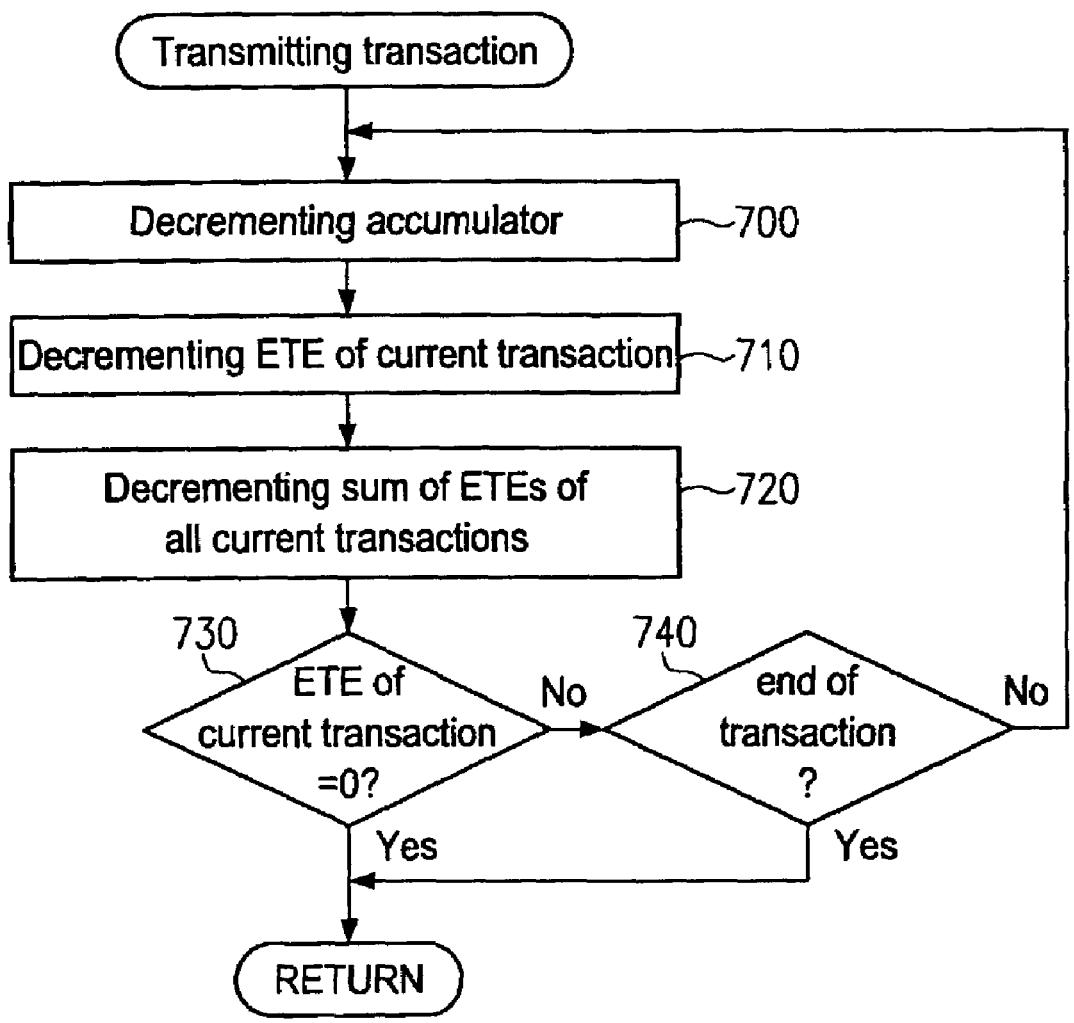
FIG. 7 is a flowchart illustrating the process of transmitting a transaction according to an embodiment.

Another accumulator update rule relates to the transaction transmission process and will be discussed in more detail with reference to FIG. 7.

In the present embodiment, an end-of-transaction flag is used for providing status information. The flag is unset when the packet handler is currently transmitting or receiving data. Thus, the process of FIG. 7 is performed as long as the end-of-transaction flag is not set.

During that time, the accumulator is decremented with every clock tick to provide as accurate an accumulator value as possible where the clock ticks are in an integer ratio to the USB bit times, e.g. one clock tick for every eight USB bits. Moreover, the process includes steps 710 and 720 of decrementing the ETE values of the current transaction and the sum of ETE values of all current transactions. This is because due to error conditions on the USB bus, the transactions may take longer than expected. Carrying out decrement operations in parallel for the actual accumulator to provide an up to date representation of the queue, as well as for the current transaction ETE and the sum of ETEs, prepares for a correct update at the end of a transmission since the accumulator is not decremented any further than was planned in advance for a given transfer to ensure consistency. For this reason, it is checked in step 730 whether the ETE value of the current transaction reaches zero. Further, it is checked in step 740 whether the end of transaction condition has been reached. If neither the planned estimated duration for the given transfer has expired nor the transaction has been completed, the process returns to step 700.

Figure 8:
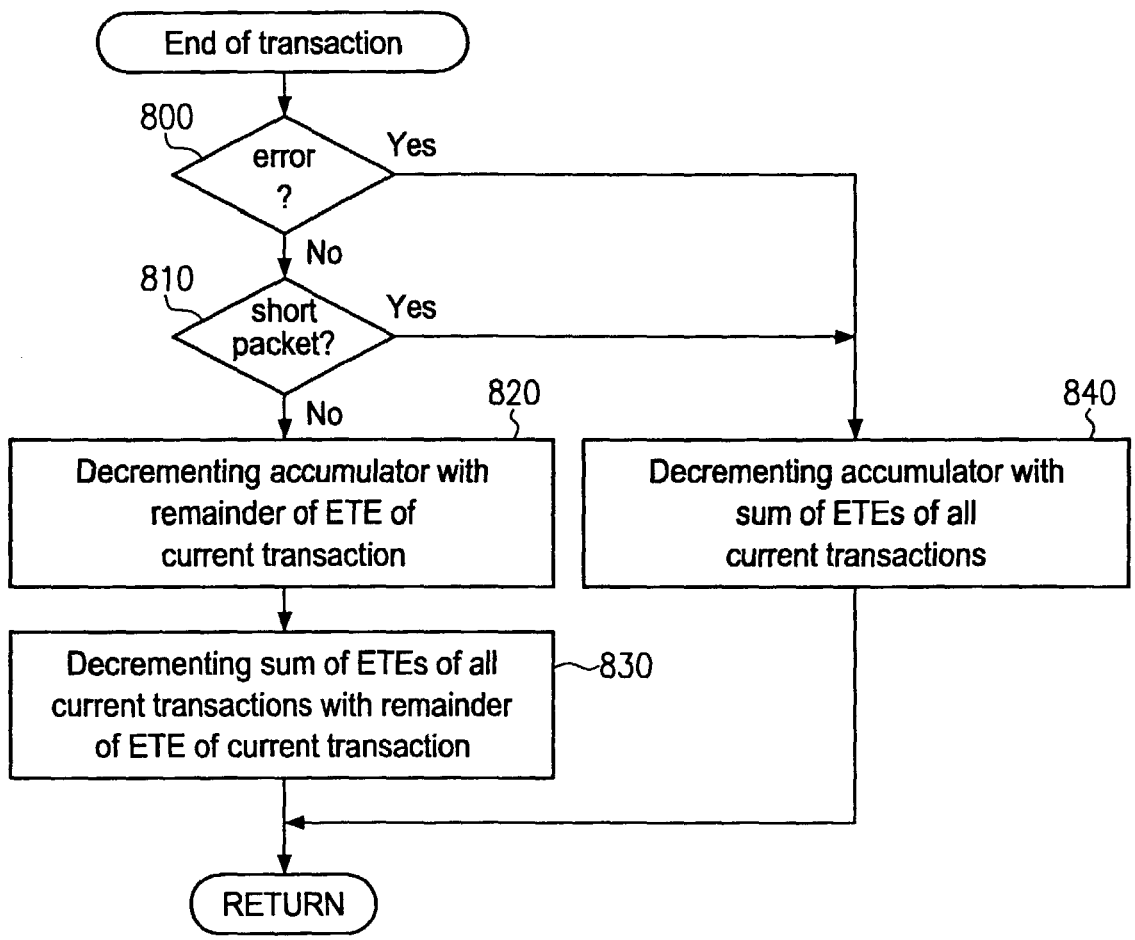
FIG. 8 is a flowchart illustrating the process performed at the end of a transaction according to an embodiment.

Another accumulator update rule is followed at the end of a transaction, and will now be discussed with reference to the flowchart of FIG. 8. In order to ensure accumulator consistency, the accumulator value is decremented with the remainder of the estimated time at the end of the transfer (step 820). The remainder is greater than zero if the transaction consumed less time than expected. This may be the typical case. On an error or short packet condition there may be even whole transactions of the current descriptor that are skipped. Therefore, the process includes respective checks in steps 800 and 810, and the accumulator is decremented by the remaining ETE sum of that whole transfer in step 840.

If the accumulator value is greater than the remaining time in the current microframe (plus the ETE threshold value mentioned above), the ETE accumulator 630 may flag that condition to the control unit 600 which may in turn cease requesting new descriptors to load into the queue.

Figure 9:
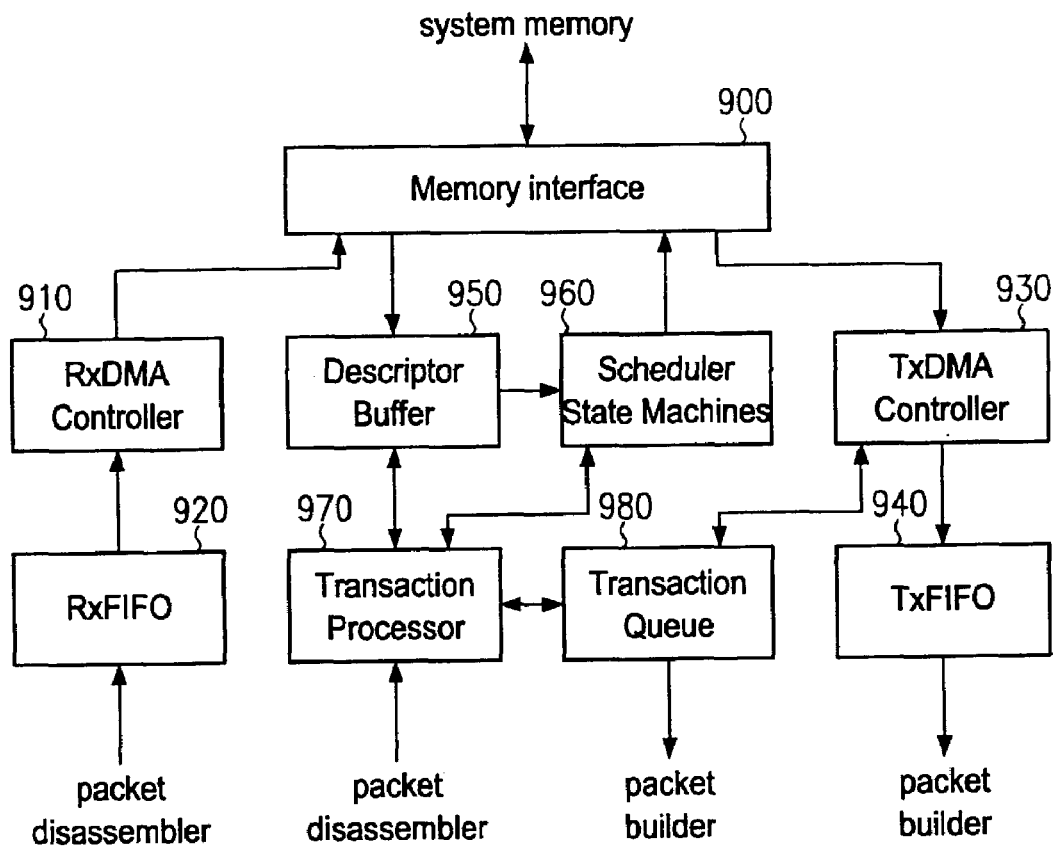
FIG. 9 illustrates the main components of a USB host controller according to another embodiment.

Turning now to FIG. 9 which illustrates a USB 2.0 compliant host controller according to another embodiment, there is again a memory interface unit 900 which can be accessed by receive and transmit DMA units containing respective controllers 910, 930 and FIFO buffers 920, 940. Further, a bus master engine is provided that contains the transaction scheduling mechanism and the transaction processor. The DMA controllers 910, 930 may likewise be thought as being contained in the bus master engine.

The bus master engine operates on a microframe-by-microframe basis, and its job is to queue up transactions in advance. The bus master engine determines what transactions are to be sent over, constructs the transactions, and retires them by writing their associated data structures back to system memory. The basic organization is therefore that of FIG. 9, i.e. it comprises a descriptor buffer 950, a scheduler state machine 960, a transaction processor 970, and a transaction queue 980. The scheduler state machine 960 may be divided into a state machine for periodically scheduled transactions and a state machine for asynchronously scheduled transactions.

The scheduling mechanism of the present embodiment is synchronized to the actual bus frame time, i.e. it operates on a frame-by-frame basis even though it includes a prefetch mechanism that works ahead. The mechanism can be operated in two operational modes: a near-end-of-frame flag mode, and a look-ahead timebase mode.

In the near-end-of-frame flag mode, the prefetching mechanism is run continuously independent of microframe boundaries, and the time remaining at the transmitter is checked. This means that the transaction queue 980 would hold transaction items that might not be able to be completed by the end of the microframe. Prior to starting each transaction, the transmitter would need to determine if there is enough time remaining in the microframe for it to be completed. Any transaction remaining in the queue would be retired unexecuted.

Thus, this operational mode is essentially what has been described above in relation to the embodiment of FIGS. 5 to 8. It may reduce the complexity of the overall circuitry. For being able to detect violations of the 80% barrier, and in order to be able to prefetch the periodic schedule at the start of each microframe, the transmitter may generate an indication some few microseconds ahead of the end of the frame. This flag would cause the scheduler 960 to switch to the periodic schedule. There should already be enough asynchronous transactions in the transaction queue to get to the end of the frame, or nearby. The exact point in the frame when the flag gets set may be programmable in integer microseconds.

Another option that would eliminate the need for the scheduler 960 to account frame time, is to operate the host controller in the look-ahead timebase mode.

In this mode, the bus master engine keeps track of how many bus clock cycles have been scheduled in the current microframe, or are remaining. Scheduled cycles are cycles within a mircroframe which will be consumed by the transactions placed in the transaction queue 980. Thus, it is determined how many of the e.g. 60,000 cycles that make up a microframe will be consumed, thus, how may cycles are remaining that can be allocated. The periodic and asynchronous schedulers 960 run well in advance of the transmitter in order to bury the latency of the accessing system memory. The look-ahead timebase will calculate on a running basis how many clocks each transaction will consume and subtract this number from the total number of cycles in the microframe. This may be used to find the last transaction of the microframe so that the next transaction can be tagged as the first in the next frame, thus delineating the frame boundary in the transaction queue.

For accounting purposes, outgoing transactions to high-speed bulk and control endpoints may always be assumed to ping successfully, i.e., the length of the data packet may be deducted from the time remaining. Also, the overhead of the ping may be deducted.

There may be times when the scheduler 960 stops processing new transfer descriptors while the bus is still running. This may occur either because the asynchronous list is empty, the asynchronous scheduler is disabled or it has paused as a result of a doorbell event. In any of these cases, the look-ahead timebase accounts for the time when the bus is idle.

Figure 10:
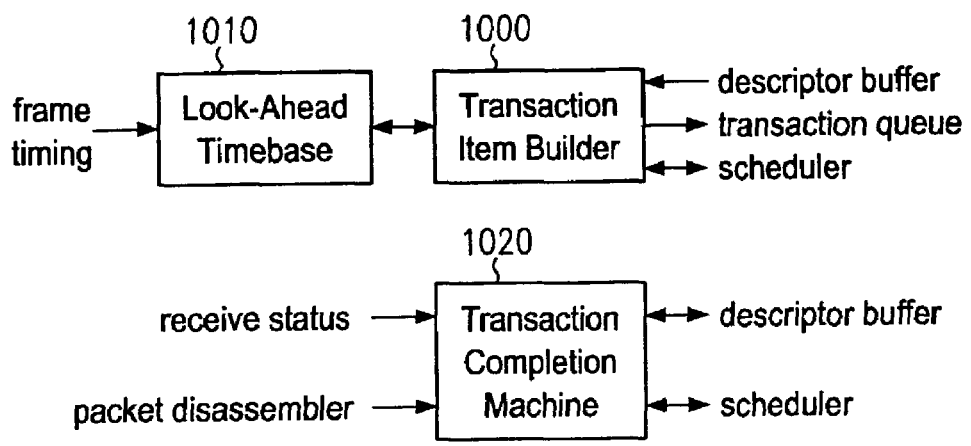
FIG. 10 is a block diagram illustrating the components of the transaction processor that is a component of the arrangement of FIG. 9.

The above mechanism will therefore be performed using a look-ahead timebase 1010 as depicted in FIG. 10 which illustrates the components of the transaction processor 970 of FIG. 9. The look-ahead timebase 1010 is connected to transaction item builder 1000 that interacts with the transaction queue 980. The transaction processor 970 further comprises a transaction completion machine 1020 which substantially corresponds to the TACM unit 540 of the USB host controller shown in FIG. 5.

In the microframe accounting mechanism, the look-ahead timebase 1010 may be constructed by operating on byte count not bit count, detecting the 80% point, padding for bus turn-around, detecting a near-end-of-microframe point, and reducing the time remaining count by the transaction length. The worst case may be assumed by taking into account handshakes.

A 13-bit microframe preload register may be provided defining the length of a microframe in bytes. The register may be a programmable register, and the value programmed into the register may equal the usable frame length in bytes.

Figure 11:
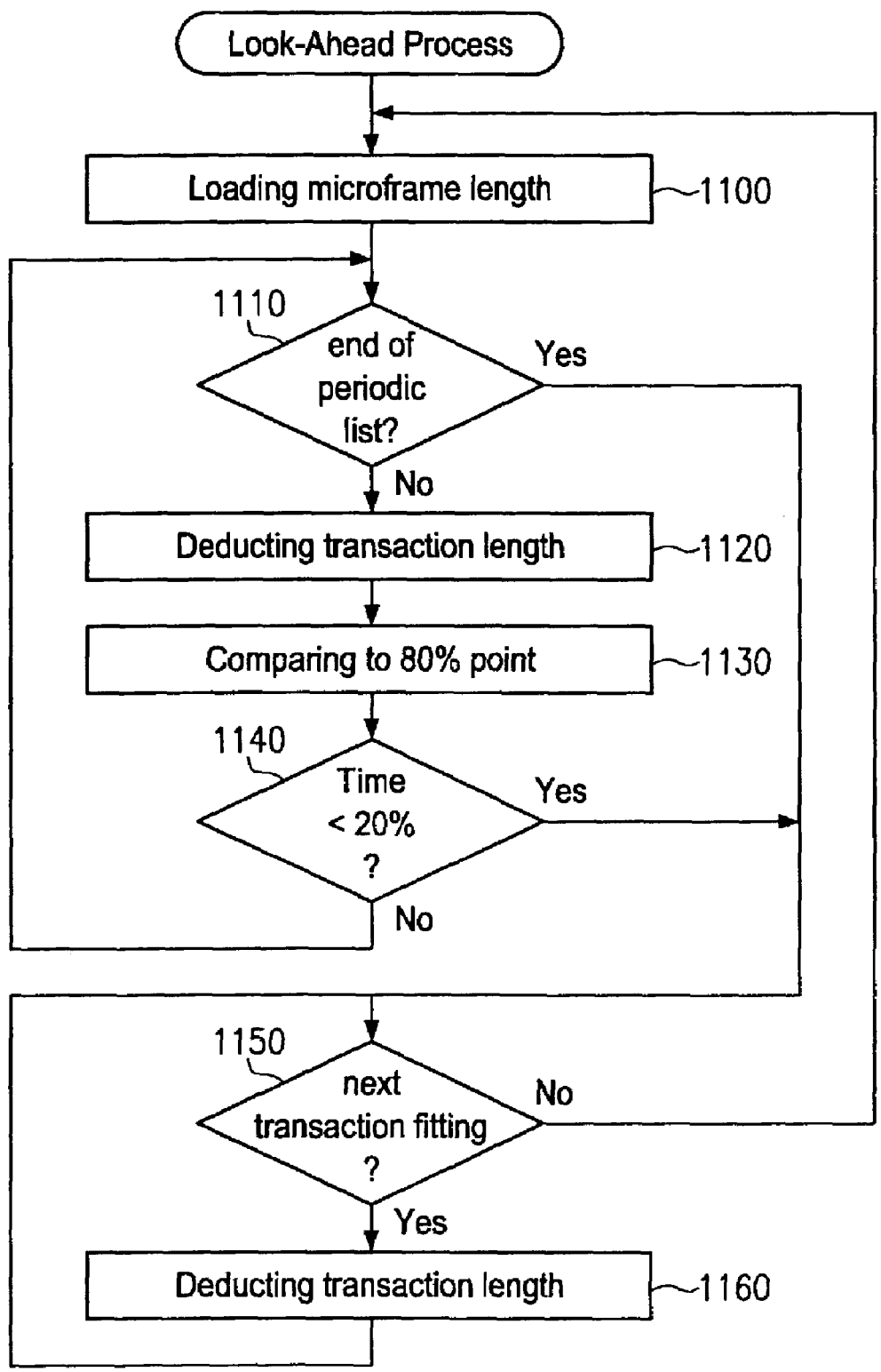
FIG. 11 is a flowchart illustrating the look-ahead process according to an embodiment.

Turning now to FIG. 11, the look-ahead process according to the present embodiment is discussed in more detail. In step 1100, the microframe length is loaded from the microframe preload register. Then, a periodic loop is entered where it is checked in step 1110 whether the end of the periodic list is reached. If so, the process continues with performing the asynchronous loop. Otherwise, the transaction length is deducted in step 1120 and compared to the 80% point in step 1130. If the time is less than 20%, the process leaves the periodic loop to enter the asynchronous loop. Otherwise, the periodic loop reiterates.

In the asynchronous loop, it is checked in step 1150 whether the next transaction will fit. If so, the transaction length is deducted and the asynchronous loop is continued. Otherwise, the end of the microframe is reached, and the next transaction is tagged as first in microframe. The process returns to step 1100 for reiterating.

Thus, taking the above embodiments into account, a transaction duration management technique is provided that may use estimated transaction lengths and that may even handle Mult (multiplier) transactions, i.e. multiple transactions for each descriptor. A running accumulation may be done where the accumulator value is decremented by the actual bus clock. The estimated values may be stored together with the descriptors in the descriptor storage unit. Further, the mechanism may include a periodic-to-asynchronous switchover.

Moreover, a look-ahead mechanism is provided in one embodiment where the estimated duration values are not stored, but a running precalculation of the total frame length reduced by the queued items is performed. The queued transaction items are pretagged as last in frame based on precalculated estimated frame times. This may simplify the transmit FIFO because items may be ordered in a single FIFO with periodic and asynchronous items being located in the same queue.

While in the above embodiments, block diagrams and flowcharts are depicted for illustrating examples of how the components of the USB host controller may be interconnected and may interact, it is to be noted that other arrangements may likewise be possible in alternative embodiments. For instance, the sequence of method steps shown in the flowcharts may be changed. Further, a USB host controller may be constructed containing elements of both the embodiment of FIGS. 5 to 8 and the embodiment of FIGS. 9 to 11.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A USB (Universal Serial Bus) host controller for handling data traffic to or from at least one USB device connected to a computer system having a system memory, the USB host controller comprising:
   a transaction processing unit adapted to process transactions to or from said at least one USB device;
   a descriptor fetch unit connected to fetch descriptors from said system memory, said descriptor fetch unit being capable of calculating an estimated duration values; and
   a transaction duration management unit arranged for determining estimated duration values for said transactions, wherein said transaction duration management unit is connected to said descriptor fetch unit for receiving the estimated duration values;
   wherein said transaction processing unit is adapted to process said transactions dependent on said estimated duration values.

2. A USB (Universal Serial Bus) host controller for handling data traffic to or from at least one USB device connected to a computer system having a system memory, the USB host controller comprising:
   a transaction processing unit to process transactions to or from said at least one USB device; and
   a transaction duration management unit arranged for determining estimated duration values for said transactions, wherein said transaction duration management unit is further arranged for storing descriptors associated to the transactions relating to said estimated duration values;
   wherein said transaction processing unit is adapted to process said transactions dependent on said estimated duration values.

3. The USB host controller of claim 2, further comprising:
   a descriptor fetch unit connected to fetch descriptors from said system memory; and
   a storage unit connected to receive and store the fetched descriptors;
   wherein said transaction processing unit is capable of processing more than one transaction for a given descriptor.

4. The USB host controller of claim 3, wherein said storage unit and said transaction processing unit are configured to concurrently store a new descriptor and processing a transaction for said given descriptor, respectively.

5. The USB host controller of claim 2, wherein said transaction duration management unit is further configured to store the determined estimated duration values.

6. The USB host controller of claim 2, wherein said transaction duration management unit is configured to apply an EHCI (Enhanced Host Controller Interface) compliant best-fit approximation algorithm when determining the estimated duration values.

7. The USB host controller of claim 6, wherein said transaction duration management unit is configured to adapt at least one parameter of said algorithm to observed time values relating to said data traffic.

8. The USB host controller of claim 6, wherein said transaction duration management unit is configured to apply said algorithm to any partial data transfer of a high-bandwidth transfer using actual transfer lengths.

9. The USB host controller of claim 2, wherein said transaction duration management unit is configured to determine a remaining time within a current microframe.

10. The USB host controller of claim 2, wherein said transaction duration management unit is configured to determine the sum of the estimated duration values for all transactions to be processed within a current microframe.

11. The USB host controller of claim 2, further comprising:
    a descriptor fetch unit connected to fetch descriptors from said system memory; and
    a storage unit connected to receive and store the fetched descriptors;
    wherein said transaction processing unit is configured to process periodically scheduled transactions as well as asynchronously scheduled transactions.

12. The USB host controller of claim 2, wherein said transaction duration management unit further comprises an accumulator unit configured to store an accumulator value indicating an estimated time to complete for all presently scheduled transactions.

13. The USB host controller of claim 12, wherein said accumulator unit is connected to receive an estimated duration value for a descriptor to be stored in said descriptor storage unit.

14. The USB host controller of claim 12, wherein said accumulator unit is connected to receive estimated duration values for all currently processed transactions of a descriptor.

15. The USB host controller of claim 12, wherein said accumulator unit is connected to receive an estimated duration value for a descriptor having associated currently processed transactions.

16. The USB host controller of claim 12, wherein said accumulator unit is connected to receive status information relating to a currently processed transaction.

17. The USB host controller of claim 16, wherein said status information includes an end-of-transaction flag being unset during transmission or reception of data in relation to said currently processed transaction.

18. The USB host controller of claim 12, wherein said accumulator unit is connected to receive time information indicating a remaining time for a current microframe.

19. The USB host controller of claim 12, wherein said transaction processing unit is arranged for processing transactions of periodical descriptors as well as asynchronous descriptors, and said accumulator unit is connected to receive a threshold value used for controlling the number of asynchronous descriptors to be prefetched based on said estimated duration values.

20. The USB host controller of claim 12, wherein said accumulator unit is arranged for decrementing said accumulator value with every clock tick during transmission of a transaction.

21. The USB host controller of claim 20, wherein said accumulator unit is arranged for disabling said decrementation if the transmission takes longer than a predefined duration.

22. The USB host controller of claim 12, wherein said accumulator unit is arranged for decrementing said accumulator value with a remainder of the estimated duration at the end of a transaction.

23. The USB host controller of claim 12, wherein said accumulator unit is arranged for decrementing said accumulator value by an amount sufficient to skip a transaction, in case of an error or a short packet condition.

24. The USB host controller of claim 23, wherein said amount is the remaining sum of all estimated duration values of the currently processed data transfer.

25. The USB host controller of claim 2, wherein said transaction duration management unit includes a description to transaction converter configured to convert descriptors to transaction items.

26. The USB host controller of claim 25, wherein said transaction items are processed by a packet handler of said USB host controller.

27. The USB host controller of claim 2, wherein said transaction duration management unit is configured to perform a running precalculation of a total frame length reduced by said estimated duration values.

28. The USB host controller of claim 27, wherein said transaction duration management unit is further configured to pretag transactions as last in frame based on said precalculation.

29. A USB (Universal Serial Bus) host controller for handling data traffic to or from at least one USB device connected to a computer system having a system memory, the USB host controller comprising:
  a transaction processing unit adapted to process transactions to or from said at least one USB device; and
  a transaction duration management unit arranged for determining estimated duration values for said transactions, wherein said transaction duration management unit is arranged for performing a running precalculation of a total frame length reduced by said estimated duration values;
  wherein said transaction processing unit is adapted to process said transactions dependent on said estimated duration values.

30. A method of operating a USB (Universal Serial Bus) host controller to handle data traffic to or from at least one USB device connected to a computer system having a system memory, the method comprising:
  determining estimated duration values for transactions to or from said at least one USB device, wherein said determining estimated duration values includes calculating said estimated duration values in a descriptor fetch unit of said USB host controller; and
  processing said transactions dependent on said estimated duration values.

31. A method of operating a USB (Universal Serial Bus) host controller to handle the data traffic to or from at least one USB device connected to a computer system having a system memory, the method comprising:
  determining estimated duration values for transactions to or from said at least one USB device;
  storing descriptors associated to the transactions relating to said estimated duration values; and
  processing said transactions dependent on said estimated duration values.

32. The method of claim 31, further comprising:
  fetching descriptors from said system memory; and
  storing the fetched descriptors;
  wherein said transaction processing comprises processing more than one transaction for a given descriptor.

33. The method of claim 32, wherein storing a new descriptor and processing a transaction for said given descriptor are performed concurrently.

34. The method of claim 31, further comprising storing the determined estimated duration values.

35. The method of claim 31, wherein determining the estimated duration values comprises applying an EHCI (Enhanced Host Controller Interface) compliant best-fit approximation algorithm.

36. The method of claim 35, further comprising adapting at least one parameter of said algorithm to observed time values relating to said data traffic.

37. The method of claim 35, wherein applying said algorithm is performed in relation to any partial data transfer of a high-bandwidth transfer using actual transfer lengths.

38. The method of claim 31, further comprising calculating said estimated duration values in a descriptor fetch unit of said USB host controller.

39. The method of claim 31, further comprising determining a remaining time within a current microframe.

40. The method of claim 31, wherein said transaction processing comprises processing periodically scheduled transactions as well as asynchronously scheduled transactions.

41. The method of claim 31, further comprising determining an accumulator value indicating an estimated time to complete for all scheduled transactions.

42. The method of claim 41, wherein determining said accumulator value is performed based on estimated duration values for all transactions of a descriptor to be stored.

43. The method of claim 41, wherein determining said accumulator value is performed based on an estimated duration value for a descriptor to be stored.

44. The method of claim 41, wherein determining said accumulator value is performed based on estimated duration values for all currently processed transactions of a descriptor.

45. The method of claim 41, wherein determining said accumulator value is performed based on an estimated duration value for a descriptor having associated currently processed transactions.

46. The method of claim 41, wherein determining said accumulator value is performed dependent on status information relating to a currently processed transaction.

47. The method of claim 41, wherein said status information includes an end-of-transaction flag being unset during transmission or reception of data in relation to said currently processed transaction.

48. The method of claim 41, wherein determining said accumulator value is performed dependent on time information indicating a remaining time for a current microframe.

49. The method of claim 41, wherein said transaction processing comprises processing transactions of periodical descriptors as well as asynchronous descriptors, and determining said accumulator value is performed dependent on a threshold value used for controlling the number of asynchronous descriptors to be prefetched based on said estimated duration values.

50. The method of claim 41, wherein determining said accumulator value comprises decrementing said accumulator value with every clock tick during transmission of a transaction.

51. The method of claim 50, wherein said decrementation is disabled if the transmission takes longer than a predefined duration.

52. The method of claim 41, wherein determining said accumulator value comprises decrementing said accumulator value with a remainder of the estimated duration at the end of a transaction.

53. The method of claim 41, wherein determining said accumulator value comprises decrementing said accumulator value by an amount sufficient to skip a transaction, in case of an error or a short packet condition.

54. The method of claim 53, wherein said amount is the remaining sum of all estimated duration values of the currently processed data transfer.

55. The method as recited in claim 31 further comprising converting descriptors to transaction items to processed by a packet handler of said USB host controller.

56. The method of claim 31, further comprising performing a running precalculation of a total frame length reduced by said estimated duration values.

57. The method of claim 56, further comprising pretagging transactions as last in frame based on said precalculation.

58. The method of claim 31, further comprising determining a sum of the estimated duration values for all transactions to be processed within a current microframe.

59. A method of operating a USB (Universal Serial Bus) host controller to handle data traffic to or from at least one USB device connected to a computer system having a system memory, the method comprising:
- determining estimated duration values for transactions to or from said at least one USB device;
- performing a running precalculation of a total frame length reduced by said estimated duration values; and
- processing said transactions dependent on said estimated duration values.

60. A method of operating a USB (Universal Serial Bus) host controller to handle data traffic to or from at least one USB device connected to a computer system having a system memory, the method comprising:
- determining estimated duration values for transactions to or from said at least one USB device, wherein determining the estimated duration values comprises applying an EHCI (Enhanced Host Controller Interface) compliant best-fit approximation algorithm, wherein applying said algorithm is performed in relation to any partial data transfer of a high-bandwidth transfer using actual transfer lengths; and
- processing said transactions dependent on said estimated duration values.

61. A USB (Universal Serial Bus) host controller for handling data traffic to or from at least one USB device connected to a computer system having a system memory, the USB host controller comprising:
- a transaction processing unit adapted to process transactions to or from said at least one USB device; and
- a transaction duration management unit arranged for determining estimated duration values for said transactions, wherein said transaction duration management unit is arranged for applying an EHCI (Enhanced Host Controller Interface) compliant best-fit approximation algorithm when determining the estimated duration values, wherein said transaction processing unit is adapted to process said transactions dependent on said estimated duration values, and wherein said transaction duration management unit is arranged for applying said algorithm to any partial data transfer of a high-bandwidth transfer using actual transfer lengths.

* * * * *